US011990061B2

(12) United States Patent
Colpaert et al.

(10) Patent No.: US 11,990,061 B2
(45) Date of Patent: May 21, 2024

(54) CLOTH-TENSIONING SYSTEM

(71) Applicant: Renson Outdoor NV, Kruisem (BE)

(72) Inventors: Stijn Colpaert, Oudenaarde (BE); Joost Benjamin Renaat De Frene, Waregem (BE)

(73) Assignee: RENSON OUTDOOR NV, Kruisem (BE)

( * ) Notice: Subject to any disclaimer, the term of this patent is extended or adjusted under 35 U.S.C. 154(b) by 213 days.

(21) Appl. No.: 17/429,148

(22) PCT Filed: Feb. 13, 2020

(86) PCT No.: PCT/IB2020/051165
§ 371 (c)(1),
(2) Date: Aug. 6, 2021

(87) PCT Pub. No.: WO2020/165808
PCT Pub. Date: Aug. 20, 2020

(65) Prior Publication Data

US 2022/0165186 A1 May 26, 2022

(30) Foreign Application Priority Data

Feb. 14, 2019 (BE) .................................. 2019/5095

(51) Int. Cl.
*G09F 15/00* (2006.01)

(52) U.S. Cl.
CPC ...... *G09F 15/0025* (2013.01); *G09F 15/0012* (2013.01)

(58) Field of Classification Search
CPC .. G09F 15/0025; G09F 15/0012; B44D 3/185
See application file for complete search history.

(56) References Cited

U.S. PATENT DOCUMENTS

| | | | | |
|---|---|---|---|---|
| 1,916,022 A * | 6/1933 | Shull | B44D 3/185 160/374.1 |
| 1,916,023 A * | 6/1933 | Shull | B44D 3/185 160/374.1 |
| 2,491,600 A * | 12/1949 | Bearce | B44D 3/185 160/374.1 |
| 3,625,274 A | 12/1971 | Johnson | |
| 3,914,887 A * | 10/1975 | Newman | B44D 3/185 160/378 |

(Continued)

FOREIGN PATENT DOCUMENTS

| | | |
|---|---|---|
| EP | 0296863 A2 | 12/1988 |
| WO | 2020165808 A1 | 8/2020 |

OTHER PUBLICATIONS

International Search Report and Written Opinion for International Application No. PCT/IB2020/051165, titled: "Cloth-Tensioning System," dated May 14, 2020.

*Primary Examiner* — Gary C Hoge
(74) *Attorney, Agent, or Firm* — HAMILTON, BROOK, SMITH & REYNOLDS, P.C.

(57) ABSTRACT

The invention relates to the field of tensioning systems for tensionable cloths. In particular, the invention provides a tensioning system and a cloth-tensioning system. The invention also relates to the use of the tensioning system and the cloth-tensioning system. Furthermore, the invention also relates to a method of tensioning a cloth using the tensioning system.

16 Claims, 7 Drawing Sheets

(56) References Cited

U.S. PATENT DOCUMENTS

| | | | | | |
|---|---|---|---|---|---|
| 3,949,802 | A * | 4/1976 | Buratovich | B44D 3/185 | 160/374.1 |
| 4,006,771 | A * | 2/1977 | Spurkel | B44D 7/00 | 160/378 |
| 4,176,480 | A * | 12/1979 | Euzarraga | G09F 15/0012 | 40/739 |
| 4,301,853 | A * | 11/1981 | Vidal | B44D 3/185 | 160/374.1 |
| 4,565,020 | A * | 1/1986 | Beatriz | B44D 3/185 | 160/374.1 |
| 4,800,947 | A * | 1/1989 | Loomis | G09F 15/0025 | 160/368.1 |
| 5,647,157 | A * | 7/1997 | Kasahara | G09F 15/0025 | 40/792 |
| 5,852,974 | A | 12/1998 | Egan et al. | | |
| 8,307,880 | B2 * | 11/2012 | Ocampo | B44D 3/185 | 160/381 |
| 8,936,065 | B1 * | 1/2015 | Gillespie | B44D 3/185 | 160/374.1 |
| 2003/0200685 | A1 * | 10/2003 | Gibb | G09F 15/0025 | 40/624 |
| 2005/0262743 | A1 * | 12/2005 | Siegenthaler | G09F 7/18 | 40/603 |
| 2009/0057364 | A1 * | 3/2009 | Ocampo | B44D 3/185 | 226/195 |
| 2021/0070098 | A1 * | 3/2021 | Van Os | G09F 7/18 | |

* cited by examiner

CLOTH-TENSIONING SYSTEM

This application is the U.S. National Stage of International Application No. PCT/IB2020/051165, filed Feb. 13, 2020, which designates the U.S., published in English, and claims priority under 35 U.S.C. § 119 or 365(c) to Belgium Application No. 2019/5095, filed Feb. 14, 2019. The entire teachings of the above applications are incorporated herein by reference.

TECHNICAL FIELD

The invention relates to the field of tensioning systems for tensionable cloths. In particular, the invention provides a tensioning system. The invention also relates to the use of the tensioning system. Furthermore, the invention also relates to a method of tensioning a cloth using the tensioning system.

TECHNOLOGICAL BACKGROUND OF THE INVENTION

Tensioning frames make it possible to screen off a space, for example as terrace covering or as side wall for a terrace covering. Optionally, the screening may be used to communicate a message in the indoor air or outdoor air. The screening is typically in the form of a flexible cloth made of textile, fabric, pvc or other types of material. This cloth can then be suspended. It is important to tension the cloth tightly, also in the corners. As a result thereof, the cloth will flutter less because of the wind and will be less prone to irregular loads. Also, creasing is preferably prevented as much as possible, both for aesthetic and mechanical reasons. To this end, a cloth-tensioning system is typically used. There are various types of systems to tension such a cloth.

For example, it is possible to use a frame with slidable profiles. By sliding the profiles of the frame, the cloth can be tensioned laterally. However, this technique has the drawback that the profiles become detached from each other and no regular finish of the corners is possible.

Another technique makes use of a canvas, wherein a cloth is tensioned on a profile by means of a slat which is screwed onto the profile with the cloth clamped in between. This solution has the drawback that the tensioning system is only accessible from the side. If the tensioned cloth is incorporated in a frame construction, removal or replacement of the cloth is impossible.

Tensioning may also be achieved by means of several springs attached between the profile and the cloth. This solution has the drawback that the tension depends on the spring force which does not allow for adjustment in situ; tensioning therefore has to be performed beforehand. In addition, the tension is difficult to achieve at the position of the corners and a connecting means such as silicone has to be used in order to keep the cloth in place. Such a solution is not sufficiently compact either.

There is therefore a need for a system which offers a solution for one or several of the aforementioned problems.

SUMMARY

The present invention and the preferred embodiments thereof aim to offer a solution for one or several of the abovementioned drawbacks. To this end, the present invention relates to a tensioning system, suitable for tensioning a tensionable cloth, and a cloth-tensioning system, comprising the tensioning system and the tensionable cloth. The invention also relates to the use of the tensioning system and the cloth-tensioning system. Furthermore, the invention also relates to a method of tensioning a cloth using the tensioning system of the cloth-tensioning system.

In a first aspect, the invention relates to a tensioning system for tensioning a tensionable cloth. The tensioning system comprises:

- a frame;
- a lateral tensioning system arranged on an inner side of the frame; and,
- a corner-tensioning system arranged in a corner of the frame.

Preferably, the frame is formed by at least one frame profile, preferably several frame profiles coupled together, wherein the one or several frame profiles comprise a means for attaching the cloth.

Preferably, the lateral tensioning system comprises at least one tensioning profile coupled to at least one frame profile, and at least one stop which is adjustably coupled or for adjustable coupling to a tensioning element, wherein the tensioning profile is configured to slide laterally over the frame, and wherein the lateral displacement is adjustable by adjusting the coupling between the tensioning profile and the tensioning element.

Preferably, the corner-tensioning system comprises at least one corner plate coupled to at least one frame profile, preferably to two adjoining frame profiles, and at least one stop which is adjustably coupled or for adjustable coupling to a tensioning element, wherein the corner plate is configured to slide diagonally over the corner of the frame, and wherein the diagonal displacement is adjustable by adjusting the coupling between the tensioning profile and the tensioning element.

Preferably, the tensioning system comprises:

- a frame formed by at least one frame profile, preferably several frame profiles coupled together, wherein the one or several frame profiles comprise a means for attaching the cloth;
- a lateral tensioning system arranged on an inner side of the frame, the lateral tensioning system comprising at least one tensioning profile coupled to at least one frame profile, and comprising at least one stop for adjustable coupling to a tensioning element, wherein the tensioning profile is configured to slide laterally over the frame, and wherein the lateral displacement is adjustable by adjusting the coupling between the tensioning profile and the tensioning element; and,
- a corner-tensioning system arranged in a corner of the frame, the corner-tensioning system comprising at least one corner plate coupled to at least one frame profile, preferably to two adjoining frame profiles, and comprising at least one stop which is adjustably coupled or for adjustable coupling to a tensioning element, wherein the corner plate is configured to slide diagonally over the corner of the frame, and wherein the diagonal displacement is adjustable by adjusting the coupling between the tensioning profile and the tensioning element.

In some embodiments, the tensioning element of the lateral tensioning system or the corner-tensioning system comprises a body and a control element which is couplable or coupled to the body. Preferably, the body is coupled to a frame profile, preferably the body is partly arranged in the frame profile. Preferably, the control element is coupled to the stop of the tensioning profile or the corner plate; wherein an adjustment of the control element over the body the tensioning profile or the corner plate to slide laterally with respect to the coupled frame profile.

In some embodiments, the tensioning element of the lateral tensioning system or the corner-tensioning system comprises a bolt and a nut which is couplable or coupled to the bolt; wherein the bolt is coupled to a frame profile, preferably wherein the bolt is partly arranged in the frame profile, and the nut is coupled to the stop of the tensioning profile or the corner plate; wherein a rotation of the nut over the bolt laterally displaces the tensioning profile or the corner plate with respect to the coupled frame profile.

In some embodiments, the tensioning profile comprises an L profile.

In some embodiments, the tensioning profile of the lateral tensioning system comprises several stops for adjustable couplings or which are adjustably coupled to several tensioning elements, wherein the stops are arranged at a certain distance apart in the longitudinal direction of the coupled frame profile; preferably, at least 50 mm to at most 350 mm; more preferably 100 mm to 300 mm; more preferably 150 mm to 250 mm; for example 200 mm.

In some embodiments, the corner plate comprises at least one diagonal stop for coupling to at least one tensioning element, wherein the coupling is configured to displace the corner plate in the diagonal direction.

In some embodiments, the corner plate comprises at least two lateral stops for coupling to at least two tensioning elements, wherein a first coupling is configured to displace the corner plate in a first lateral direction and a second coupling is configured to displace the corner plate in a second lateral direction, wherein the first and the second lateral direction are preferably virtually perpendicular to each other.

In some embodiments, the corner-tensioning system comprises an angle bracket which is arranged in a corner of the frame, wherein one side of the angle bracket is coupled to two adjoining frame profiles and the other side is coupled to the corner plate.

In some embodiments, the angle bracket comprises a diagonally projecting coupling element, wherein the coupling element is couplable with or to a diagonal stop of the corner plate.

In some embodiments, the tensioning system comprises at least four corner-tensioning systems which are arranged in each corner of the frame.

In some embodiments, the means for attaching a cloth comprises a cloth profile to which or in which a cloth can be fastened, wherein the cloth profile is preferably arranged in the frame profile.

In a further aspect, the invention relates to a cloth-tensioning system, comprising:

- the tensioning system according to one or several embodiments as described herein; and,
- a tensionable cloth fastened to the frame of the tensioning system.

Preferably, the cloth is arranged over a tensioning profile of one or several lateral tensioning systems, and over a corner plate of one or several corner-tensioning systems.

In some embodiments, the cloth comprises a base cloth and a fastening strip, which is fastenable or fastened to the frame of the tensioning system, preferably to several frame profiles coupled together.

In a further aspect, the invention relates to a method for tensioning a non-fastened cloth. The method preferably comprises at least the following steps:

- (a) providing a tensionable cloth and a tensioning system according to one or several embodiments as described herein;
- (b) fastening the tensionable cloth to a frame of the tensioning system, preferably to several frame profiles coupled together;
- (c) laterally tensioning the cloth by adjusting the adjustable coupling between a stop of a tensioning profile and a tensioning element of the lateral tensioning system; and,
- (d) diagonally tensioning the cloth by adjusting the adjustable coupling between a stop of a corner plate and a tensioning element of the corner-tensioning system.

In a further aspect, the invention relates to a method for tensioning a fastened cloth. The method preferably comprises at least the following steps:

- (a') providing a cloth-tensioning system according to one or several embodiments as described herein;
- (c') laterally tensioning the cloth by adjusting the adjustable coupling between a stop of a tensioning profile and a tensioning element of the lateral tensioning system; and,
- (d') diagonally tensioning the cloth by adjusting the adjustable coupling between a stop of a corner plate and a tensioning element of the corner-tensioning system.

In some embodiments, the lateral and diagonal tensioning of steps (c) and (d) is carried out simultaneously, step by step, and/or in turns.

In a further aspect, the invention relates to a use of a tensioning system according to one or several embodiments as described herein for tensioning a tensionable cloth.

DESCRIPTION OF THE FIGURES

In order to better show the features of the invention, some preferred embodiments of the present invention are described in the attached figures by way of non-limiting example. The numerical reference numerals are explained in more detail in the examples. In the figures, claims and examples, the following numbering is used: 50—tensionable cloth; 50'—tensioned cloth; 100—tensioning system; 110—frame profile; 150—cloth-tensioning system; 160—cloth profile; 200—lateral tensioning system; 210—tensioning profile of the lateral tensioning system; 215—stop of the tensioning profile; 250—tensioning element couplable to the stop of the tensioning profile; 250'—bolt; 250"—nut; 300—corner-tensioning system; 310—corner plate of the corner-tensioning system; 315—stop of the corner plate; 350—tensioning element couplable to the stop of the corner plate; 370—angle bracket.

DETAILED DESCRIPTION

Figure 1A:
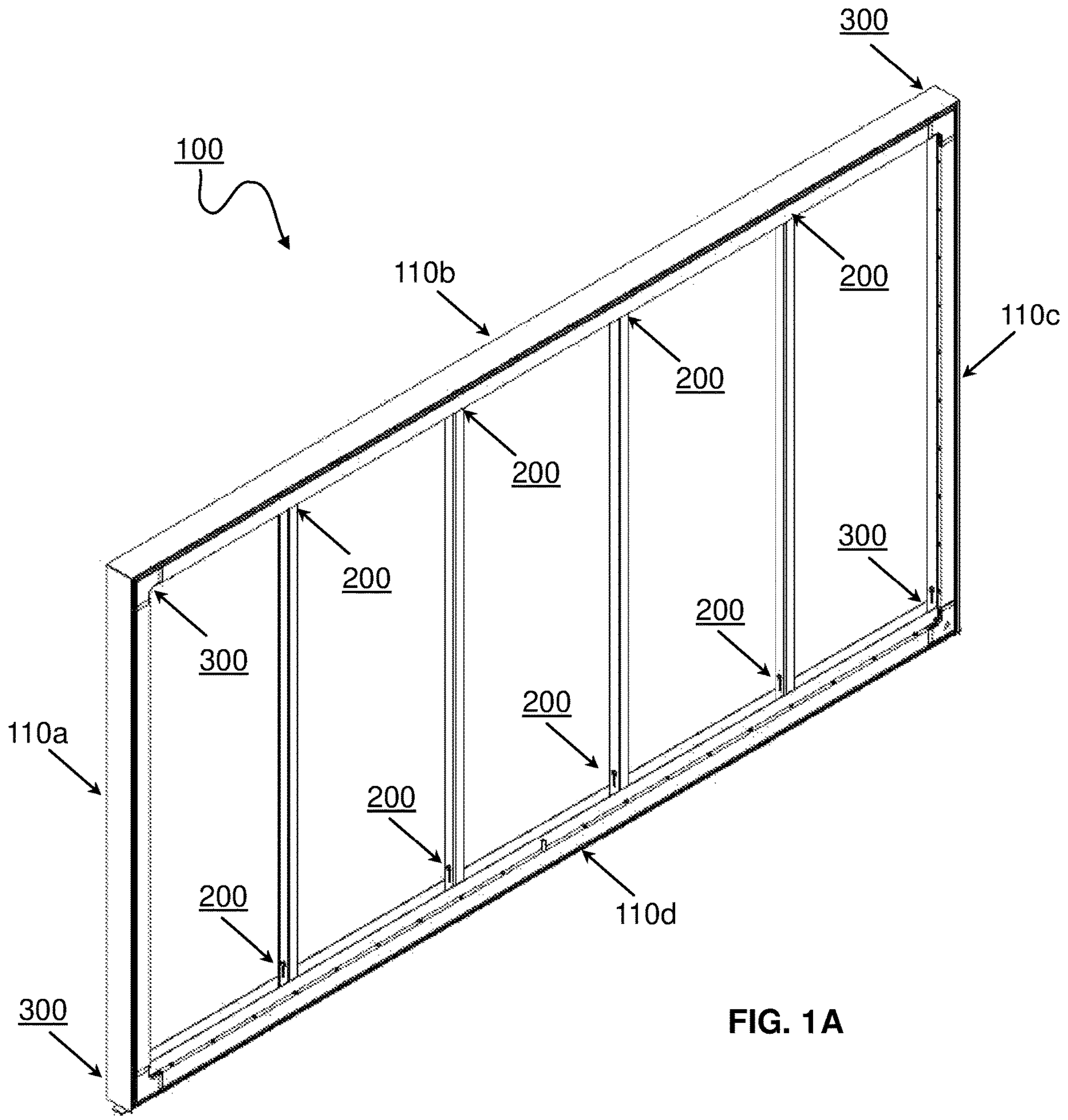
FIG. 1A shows a preferred embodiment of a tensioning system (100) for a tensionable cloth (50) along the front of the frame.

Before describing the present system and method according to the invention, it should be understood that this invention is not limited to the described specific systems and techniques or combinations, since such systems and methods and combinations can obviously vary. It should also be clear that the terminology used herein is not intended to be limiting, since the scope of the present invention is only limited by the attached claims.

All documents cited in the present specification are fully incorporated herein by way of reference.

As used herein, the singular forms "a", "an", and "the" include both the singular and plural form unless the context clearly dictates otherwise.

The terms "comprise", "comprises" and "comprising" as used herein are synonymous with "include", "includes" or "contain", "contains", and are inclusive or open-ended and do not exclude additional, non-recited members, elements or method steps. The terms "comprise", "comprises" and "comprising" include the term "contain".

The enumeration of numeric values by means of a range of figures comprises all values and fractions in these ranges, as well as the cited end points.

The term "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar as such variations are appropriate to perform in the disclosed invention. It is to be understood that the value to which the modifier "approximately" refers was itself also disclosed.

In the following passages, various aspects of the invention are defined in more detail. Each aspect so defined may be combined with any other aspect or aspects unless clearly indicated otherwise. In particular, any feature indicated as being "preferred" or "advantageous" may be combined with any other feature or features indicated as being "preferred" and/or "advantageous". Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification do not necessarily all refer to the same embodiment, but may do. Furthermore, the described features, structures or characteristics may be combined in any suitable manner, as would be apparent to a person skilled in the art from this description. The embodiments described and claimed in the claims may be used in any combination. In the present description of the invention, reference is made to the attached drawings which form part thereof and illustrate these specific embodiments of the invention. Figures in brackets or in bold linked to certain elements illustrate the respective elements by way of example, without limiting the elements as a result thereof. It should be understood that other embodiments may be used and structural or logical changes may be made without departing from the scope of the present invention. The following detailed description is not to be regarded as limiting, and the scope of the present invention is defined by the attached claims.

Unless defined otherwise, all terms disclosed in the invention, including technical and scientific terms, have the meaning which a person skilled in the art usually gives them. For further guidance, definitions are included to further explain terms which are used in the description of the invention.

A tensioning system as used herein relates to a system for tensioning a tensionable cloth; the tensioning system tensions the cloth. The tensioning system may be self-contained, without cloth. Only when the cloth has been fastened to the tensioning system it is referred to as a cloth-tensioning system. The term "cloth-tensioning system" thus describes the combination of a tensioning system and a cloth.

The cloth relates to a flexible medium which can be tensioned; examples of suitable cloth material for the present invention are woven textile or fabric, plastic membrane or film, fibreglass, (fine) metal gauze, or other types of cloth material. The cloth may be provided with a print.

The cloth may comprise a base cloth and a fastening strip, wherein the fastening strip is fastenable to the frame of the tensioning system or is fastened to the frame of the cloth-tensioning system. Typically, a thickening is provided (for example in the form of a half zip) on the edge of the screen and it is this thickening which is incorporated in the cloth profile.

A frame or framework as used herein refers to a rigid structure which is suitable to support and preferably frame a cloth. The frame typically has frame walls and frame corners; the connections between opposite frame corners form the diagonals of the frame. The inside (or inner side) of the frame refers to the wall which delimits the inner space which is formed by the frame. Analogically, the outside wall (or outer side) will delimit the outer space. The front of the frame refers to the side to which the cloth can or will be fastened; in this case, the front is preferably in contact with the cloth. The rear of the frame consequently refers to the opposite side which is remote from the cloth; the rear will preferably form the access to the tensioning elements which make control of the tension of the cloth possible.

The frame may be formed by a single frame profile. However, it is easier and more efficient to produce several frame profiles and subsequently couple these to each other in order to form a frame. The frame profiles are preferably configured to give the frame a virtually quadrangular shape, more preferably a virtually rectangular shape. The terms quadrangular and rectangular, as used herein and referring to the frame, relate to an arrangement of the frame profiles whose outline virtually forms a quadrangle or a rectangle, respectively. The term virtually then has to be interpreted as meaning that the body resembles the aforementioned geometric shape to a significant extent, that is to say except for some roundings, projections, coupling elements, grooves, slots, ridges, openings, connecting pieces, reinforcing means, and the like; see the figures for further clarification. Preferably, the frame profiles which form part of the frame are arranged in such a way that their outline delimits the outer edge of the frame. Numerous variations of the dimensions of the frame and of the frame profiles are possible; starting, for example, from 0.5 m up to 3.0 m per side; for example 1.0 m, for example 1.5 m, etc. In some embodiments, the frame has a first dimension (for example height) of at least 1.0 m up to at most 3.0 m, for example of 1.2 m up to 2.6 m, for example of 1.4 m up to 2.2 m, for example of approximately 1.8 m. In some embodiments, the frame has a second dimension (for example length) of at least 2.0 m up to at most 6.0 m, for example of 3.0 m up to 5.0 m, for example of 3.5 m up to 4.5 m, for example of approximately 4.0 m.

The front of the frame is the side where the tensioning system is typically not visible. The rear of the frame is the side where the tensioning system is visible.

A profile as used herein refers to a rigid and preferably elongate body, typically used as rim of a frame. Depending on the desired embodiment, a profile may be both rounded and flat, have a wide or a narrow wall, be hollow or filled with a filler on the inside, be ribbed or smooth, and/or comprise ornamental finishes; it is assumed that the advantages and drawbacks of the various embodiments are known to the person skilled in the art. If the profile contains a hole which is surrounded by the walls of the profile, then this may also be referred to as a tube profile. The profiles are made of a rigid material which may be, for example, aluminum. Using aluminum as profile material has many advantages; specifically that it is strong yet lightweight, readily able to withstand adverse weather conditions and requires little maintenance, all at the same time. However, other materials are also suitable and the advantages or drawbacks are presumed to be known to a person skilled in the art. The profiles may be coupled to each other by means of a coupling element, such as a strip or clamping profile. Two adjoining profiles which form a corner of the frame can also be coupled by means of an angle bracket, which is discussed below in more detail.

In this case, lateral refers to the direction towards the outer side of the frame, that is to say from the inside to the outside. In this case, central or medial refers to the direction towards the center on the inner side of the frame, that is to say from the outside to the inside. Proximal refers to an element or a side which is situated closer to another element. Here, diagonal refers to in the direction of a corner of the frame, that is to say from the center to a corner of the frame.

In a first aspect, the invention relates to a tensioning system for tensioning a tensionable cloth. The tensioning system comprises:

- a frame;
- a lateral tensioning system arranged on an inner side of the frame; and,
- a corner-tensioning system arranged in a corner of the frame.

Preferably, the frame is formed by at least one frame profile, preferably several frame profiles coupled together, wherein the one or several frame profiles comprise a means for attaching the cloth.

Preferably, the lateral tensioning system comprises at least one tensioning profile coupled to at least one frame profile, and at least one stop which is adjustably coupled or for adjustable coupling to a tensioning element, wherein the tensioning profile is configured to slide laterally over the frame, and wherein the lateral displacement is adjustable by adjusting the coupling between the tensioning profile and the tensioning element.

Preferably, the corner-tensioning system comprises at least one corner plate coupled to at least one frame profile, preferably to two adjoining frame profiles, and at least one stop which is adjustably coupled or for adjustable coupling to a tensioning element, wherein the corner plate is configured to slide diagonally over the corner of the frame, and wherein the diagonal displacement is adjustable by adjusting the coupling between the tensioning profile and the tensioning element.

Preferably, the tensioning system comprises:

- a frame formed by at least one frame profile, preferably several frame profiles coupled together, wherein the one or several frame profiles comprise a means for attaching the cloth;
- a lateral tensioning system arranged on an inner side of the frame, the lateral tensioning system comprising at least one tensioning profile coupled to at least one frame profile, and comprising at least one stop which is adjustably coupled or for adjustable coupling to a tensioning element, wherein the tensioning profile is configured to slide laterally over the frame, and wherein the lateral displacement is adjustable by adjusting the coupling between the tensioning profile and the tensioning element; and,
- a corner-tensioning system arranged in a corner of the frame, the corner-tensioning system comprising at least one corner plate coupled to at least one frame profile, preferably to two adjoining frame profiles, and comprising at least one stop which is adjustably coupled or for adjustable coupling to a tensioning element, wherein the corner plate is configured to slide diagonally over the corner of the frame, and wherein the diagonal displacement is adjustable by adjusting the coupling between the tensioning profile and the tensioning element.

In a further aspect, the invention relates to a cloth-tensioning system, comprising:

- the tensioning system according to one or several embodiments as described herein; and,
- a tensionable cloth fastened to the frame of the tensioning system.

Preferably, the cloth is arranged over a tensioning profile of one or several lateral tensioning systems, and over a corner plate of one or several corner-tensioning systems.

The tensionable cloth may be (or have been) tensioned laterally by means of one or several lateral tensioning systems and/or may be (or have been) diagonally tensioned by means of one or several corner-tensioning systems. As a result thereof, the tensioning system and the cloth-tensioning system as described herein may allow for a simple and quick fitting of a tensionable cloth. Suitable or preferred embodiments of the tensioning system are also suitable or preferred embodiments of the cloth-tensioning system.

The systems allow a regular finish at the position of both the sides and the corners of the cloth; as a result thereof some creasing may be noticeably reduced or even removed. The finish may in addition be controlled locally in a user-friendly way and be adapted to the dimensions of the cloth. As a result of the fact that the lateral tensioning systems and corner-tensioning systems are accessible from the rear, it remains possible to readjust the cloth (e.g. if the tension decreases over the course of time) or even detach it in order to maintain or replace it. In addition, the lateral tensioning systems and corner-tensioning systems remain accessible if the tensioned cloth is fitted into an external frame construction (e.g. in case of installation on a building or on a roof).

During readjustment, the frame profiles remain coupled to each other, thus also reducing the risk of the frame coming apart. As a result thereof, both the safety and the stability of the system can be improved. In addition, the size of the frame can also be limited (in terms of thickness), thus improving the visual appearance, for example as a freestanding wall (with a vertically oriented frame) or as a roof structure (with a horizontally oriented frame). The finish of the frame can easily be modified without the risk of damaging the cloth.

There is no need for (temporary) connecting means, such as adhesive or silicone, in order to keep the cloth in position. The cloth can initially be fastened to the frame and can subsequently be tensioned.

The lateral tensioning system makes it possible to tension the cloth in the lateral direction.

In some embodiments, the tensioning element of the lateral tensioning system or the corner-tensioning system comprises a body and a control element which is couplable or coupled to the body. Preferably, the body is coupled to a frame profile, preferably the body is partly arranged in the frame profile. Preferably, the control element is coupled to the stop of the tensioning profile or the corner plate; wherein an adjustment of the control element over the body the tensioning profile or the corner plate to slide laterally with respect to the coupled frame profile.

In some embodiments, the tensioning element of the lateral tensioning system or the corner-tensioning system comprises a bolt and a nut which is couplable or coupled to the bolt; wherein the bolt is coupled to a frame profile, preferably wherein the bolt is partly arranged in the frame profile, and the nut is coupled to the stop of the tensioning profile or the corner plate; wherein a rotation of the nut over the bolt laterally displaces the tensioning profile or the corner plate with respect to the coupled frame profile.

The tensioning profile is preferably arranged on the inner side of the frame; it will be proximally arranged with respect to the frame profile (relative to the center of the frame). Due to the fact that the tensioning profile is arranged proximally, an adjustment of the coupling between the stop of the tensioning profile and the associated tensioning element will cause the body of the tensioning profile to move laterally. Such an arrangement is regarded as a lateral coupling. Due to the fact that the tensioning profile is arranged at the front of the frame, the lateral displacement of the tensioning profile will cause the body of the tensioning profile to slide over the frame profile. The rear of the tensioning profile preferably does not make any direct contact with the frame profile, but maintains a predetermined distance with respect to the front of the frame profile. This distance is preferably adapted to the thickness of the cloth.

From a certain degree of lateral displacement onwards (referring to the distance which the tensioning profile has travelled with respect to the coupled frame profile), the tensioning profile will slidingly engage with a cloth which was fastened to the frame profile. Further lateral displacement will subsequently clamp the cloth between the tensioning profile and the frame profile. The clamping will apply tension to the cloth as a result of which it is tensioned; the cloth is tensioned laterally. The tension can be modified by adjusting the degree of lateral displacement, which is controlled directly by adjusting the coupling between the tensioning profile and the tensioning element.

The tensioning profile is preferably an L-shaped profile, or L profile for short. This profile is characterized by a body consisting of two surfaces, wherein the first surface forms a perpendicular angle with the second surface. The first surface may comprise a stop for coupling with a tensioning element and the second surface may slide over the frame profile for tensioning the cloth.

The lateral tensioning system may also comprise several stops for adjustable couplings with several associated tensioning elements; for example two stops, three stops, or more. The several stops are preferably adjustably coupled with the several associated tensioning elements. The stops will preferably lie in the same plane, as a result of which the tensioning elements can be arranged parallel to each other. In this case, the several stops are arranged at a certain distance apart in the longitudinal direction of the coupled frame profile; preferably, the distance between each stop is at least 50 mm to at most 350 mm; more preferably 100 mm to 300 mm; more preferably 150 mm to 250 mm; for example 200 mm.

The tensioning system of the cloth-tensioning system may comprise several lateral tensioning systems which are arranged on a single side of the frame, preferably next to each other in the longitudinal direction of a frame profile. Providing several tensioning systems may be an alternative to an elongate tensioning system with several stops.

The tensioning system of the cloth-tensioning system may comprise at least two lateral tensioning systems, wherein each tensioning system is arranged at opposite sides of the frame. The tensioning system may furthermore comprise at least four lateral tensioning systems, wherein each tensioning system is arranged at a side of the frame. Providing several lateral tensioning systems ensures that creasing on the cloth can be reduced further and more evenly.

The corner-tensioning system makes it possible to tension the cloth in the diagonal direction. In this case, diagonal means in the direction of a corner of the frame, that is to say from the center to a corner of the frame. Typically, two adjoining frame profiles are positioned at an angle, such as a mitered corner. The miter angle may be 45° or correspond to the corner of the diagonal of the frame.

Due to the fact that the corner plate is preferably arranged on the inner side of the corner of the frame, an adjustment of the coupling between the stop of the corner plate and the associated tensioning element will cause the body of the corner plate to move diagonally. Due to the fact that the corner plate is furthermore arranged at the front of the frame, the diagonal displacement of the corner plate will cause the body of the corner plate to displace over one or several (adjoining) frame profiles which form the corner. The rear of the corner plate preferably does not make direct contact with the frame profiles, but maintains a predetermined distance to the front of the frame profiles. This distance is preferably adapted to the thickness of the cloth.

From a certain degree of diagonal displacement onwards (referring to the distance which the corner plate has travelled with respect to the frame profiles which form the corner), the corner plate will slidingly engage with a cloth which was fastened to the frame profile. Further diagonal displacement will subsequently clamp the cloth between the corner plate and the two adjoining frame profiles. The clamping will apply tension to the cloth as a result of which it is tensioned; the cloth is tensioned diagonally. The tension can be modified by adjusting the degree of diagonal displacement, which is controlled directly by adjusting the coupling between the corner plate and the tensioning element.

The corner-tensioning system may comprise at least one stop for adjustably coupling or adjustably coupled with at least one tensioning element. With one stop, the coupling will preferably be configured to displace the corner plate in the diagonal direction of the frame, that is to say in the direction of the diagonal formed by the corner in which the corner plate is arranged, preferably by the corner between two adjoining frame profiles. Such an arrangement is regarded as a diagonal coupling. With a diagonal coupling, the surface formed by the opening of the at least one diagonally-oriented stop will form a perpendicular angle with a diagonal of the frame.

Alternatively or additionally, the corner-tensioning system may comprise at least two stops for adjustably coupling or adjustably coupled with at least two tensioning elements.

With two stops, the couplings may be configured for lateral displacement, wherein a first coupling is configured to displace the corner plate in a first lateral direction, wherein a second coupling is configured to displace the corner plate in a second lateral direction, and wherein the first and the second lateral directions are preferably virtually perpendicular to each other. Due to the fact that the two couplings cause two lateral displacements at a perpendicular angle, a simultaneous and/or stepwise adjustment of the couplings will cause a diagonal displacement of the corner plate. If the corner is formed by two adjoining frame profiles (at an angle of virtually) 90°, the first stop is preferably configured to displace the corner plate in the lateral direction of the first frame profile, and the second stop is preferably configured to displace the corner plate in the lateral direction of the second frame profile.

Furthermore, the corner-tensioning system may comprise at least three stops for adjustably coupling or adjustably coupled with at least three tensioning elements. With three stops, a combination can be made of one diagonal coupling and two lateral couplings at a perpendicular angle. Then, at least a first coupling will be configured to displace the corner plate in the diagonal direction of the frame, a second coupling to displace the corner plate in a first lateral direction and a third coupling to displace the corner plate in a second lateral direction. The displacement of the corner plate in three different directions may allow very precise control of the tension, as a result of which a creaseless corner may be achieved. The corner-tensioning system may also comprise several stops for adjustably coupling or adjustably coupled with several tensioning elements; for example five stops, seven stops or more.

The corner-tensioning system may furthermore comprise an angle bracket which is arranged in a corner of the frame which is coupled or couplable with a corner plate. If the corner is formed by two adjoining frame profiles, the angle bracket is preferably coupled to the two adjoining frame profiles. The angle bracket makes it possible to couple two adjoining frame profiles to each other at an angle. In this case, the angle bracket increases the stability and rigidity of the tensioning system. Preferably, one side of the angle bracket is coupled to two adjoining frame profiles and the other side is coupled to the corner plate.

The angle bracket may furthermore comprise a diagonally projecting coupling element; the coupling element is preferably arranged in the diagonal direction. The diagonally projecting coupling element may be coupled to a diagonal stop of the corner plate. Such a coupling element may facilitate the coupling of the corner plate to the frame profiles and make the diagonal adjustment more user-friendly.

The tensioning system or the cloth-tensioning system may comprise at least two corner-tensioning systems, wherein each tensioning system is arranged on opposite or neighboring corners of the frame. The cloth may, for example, be tightly fastened to the top or bottom of the frame, as a result of which only a tensioning of the cloth at the two bottom or top corners is required. The tensioning system may furthermore comprise at least four corner-tensioning systems, wherein each tensioning system is arranged in a corner of the frame. Providing four corner-tensioning systems ensures that creasing in the corners of the cloth can be reduced in an optimum manner.

The tensioning element is a means to provide an adjustable coupling with the stops of the lateral tensioning systems and corner-tensioning systems. The term adjustable coupling is understood to mean that the coupling between the tensioning element and associated stop allows for a degree of adjustment which corresponds to a certain displacement distance of the tensioning profile or the corner plate. The tensioning element may be provided with a means to engage with the stop.

The adjustable coupling can be brought about if the tensioning element of the lateral tensioning system or the corner-tensioning system comprises a body and a control element. The body is preferably an elongate object. The body may be partly coupled to a frame profile, preferably by arranging a first end of the body in a space of the frame profile wherein the body is preferably clamped by the frame profile. The second end of the body may subsequently project from the frame profile in the medial direction, that is to say towards the inner side of the frame. The control element may be coupled or couplable with a stop of the tensioning profile or a stop of the corner plate; preferably, the body will be positioned partly inside the opening of the stop, so that the control element can engage with the body at the second end thereof and thus couple the stop. An adjustment of the control element with respect to the body, preferably over the body, can thus displace the tensioning profile or the corner plate laterally with respect to the coupled frame profile.

The simplest way of bringing about an adjustable coupling is by threading an elongate object (e.g. a bolt or threaded rod) and coupling it with a hole provided with a corresponding screw thread (e.g. the hole of the stop or a nut, such as a self-locking nut, wingnut, flanged nut, etc). Other adjustable tensioning elements may be provided, but are often of lesser commercial interest. In addition, such coupling systems make it possible to turn back the coupling, as a result of which the tension on the cloth can be reduced and the cloth can be removed or replaced in a simple way.

Preferably, the tensioning element of the lateral tensioning system or the corner-tensioning system comprises a bolt which is couplable or coupled to a nut. The bolt may be partly coupled to a frame profile. In particular, the bolt head may be arranged in a space of the frame profile in which it is preferably clamped by the frame profile. The bolt body can then project from the frame profile in the medial direction, that is to say towards the inner side of the frame. The nut may be coupled against a stop of the tensioning profile or a stop of the corner plate. If the nut is coupled to the associated bolt, the bolt will pass through the hole of the stop. In particular, the nut can be placed over the stop, so that the stop is coupled between the nut and the frame profile to which the bolt is coupled; as a result thereof, the tensioning profile is coupled or the corner plate is coupled to the frame profile. The coupling between the bolt and the nut is regarded as an adjustable coupling; a rotation of the nut over the body of the bolt will adjust the coupling. Adjustment of this coupling will laterally displace the tensioning profile towards the coupled frame profile, or decoupling thereof will centrally displace the tensioning profile away from the coupled frame profile. Similarly, a rotation of the nut over a bolt coupled to a diagonal stop will diagonally displace the corner plate in the direction of the corner of a frame, in particular in the direction of the one or several coupled frame profiles which form the corner.

The means for attaching the cloth may comprise a cloth profile to which or in which a cloth can be fastened. Preferably, the cloth profile is arranged in the frame profile. This has advantages with regard to the stability and safety of the system. Preferably, the cloth profile is arranged in the frame profile via a click-fit connection. This results in a quick and strong installation of the cloth profile in the frame profile. In some embodiments, the cloth is fastened to the cloth profile, for example via a half zip.

The tensioning system or the cloth-tensioning system may comprise a supporting element provided in the frame. The supporting element may be an additional frame profile which is provided in the frame (instead of the rim of the frame). Using such supporting elements may be of interest in the case of frames of a certain size and are at risk of sagging.

The tensioning system or the cloth-tensioning system may comprise an anchoring element for anchoring the frame to an external structure. The anchorage may be permanent, for example followed by or combined with an adhesive bonding operation. The anchorage may be non-permanent, for example only screwed in. Typically, with the anchorage, use will be made of fastening means (e.g. screws, anchor points and the like).

In a further aspect, the invention relates to a method for tensioning a non-fastened cloth. The method preferably comprises at least the following steps:

(a) providing a tensionable cloth and a tensioning system according to one or several embodiments as described herein;

(b) fastening the tensionable cloth to a frame of the tensioning system, preferably to several frame profiles coupled together;

(c) laterally tensioning the cloth by adjusting the adjustable coupling between a stop of a tensioning profile and a tensioning element of the lateral tensioning system; and, (d) diagonally tensioning the cloth by adjusting the adjustable coupling between a stop of a corner plate and a tensioning element of the corner-tensioning system.

In a further aspect, the invention relates to a method for tensioning a fastened cloth. The method preferably comprises at least the following steps:

(a') providing a cloth-tensioning system according to one or several embodiments as described herein;

(c') laterally tensioning the cloth by adjusting the adjustable coupling between a stop of a tensioning profile and a tensioning element of the lateral tensioning system; and, (d') diagonally tensioning the cloth by adjusting the adjustable coupling between a stop of a corner plate and a tensioning element of the corner-tensioning system.

These methods have the advantage that the installation can be simpler, more user-friendly and/or quicker.

The lateral and diagonal tensioning in steps (c) and (d) (or (c') and (d')) may be carried out simultaneously. The lateral and diagonal tensioning in steps (c) and (d) (or (c') and (d')) may also be carried out step by step; for example lateral tensioning first, followed by diagonal tensioning. The lateral and diagonal tensioning in steps (c) and (d) (or (c') and (d')) may also be carried out in turns; for example lateral tensioning first, followed by diagonal tensioning and again followed by lateral tensioning. It is also possible to carry out a combination of simultaneous, step-by-step tensioning and/or tensioning in turns. The methods have the advantage that a neat and crease-free tensioned cloth can be obtained, irrespective of the chosen order of tensioning.

In a further aspect, the invention relates to a method for detaching a fastened cloth, comprising the following steps:

(a") providing an already tensioned cloth-tensioning system according to one or several embodiments as described herein;

(c") centrally releasing the cloth by adjusting the adjustable coupling between a stop of a tensioning profile and a tensioning element of the lateral tensioning system; and, (d") diagonally releasing the cloth by adjusting the adjustable coupling between a stop of a corner plate and a tensioning element of the corner-tensioning system.

Due to the fact that the tensioning elements are readily accessible, tensioned cloth can easily be released.

In a further aspect, the invention relates to a method for readjusting a fastened cloth, comprising the following steps:

(a''') providing an already tensioned cloth-tensioning system according to one or several embodiments as described herein;

(c''') laterally tensioning and/or centrally releasing the cloth by adjusting the adjustable coupling between a stop of a tensioning profile and a tensioning element of the lateral tensioning system; and, (d''') diagonally tensioning and/or releasing the cloth by adjusting the adjustable coupling between a stop of a corner plate and a tensioning element of the corner-tensioning system.

Due to the fact that the tensioning elements are readily accessible, tensioning of the cloth can easily be readjusted. This is particularly important in case the cloth is exposed to weather conditions, in which different parts of the cloth may expand or shrink due to temperature variations or moisture.

In a further aspect, the invention relates to the use of a tensioning system according to one or several embodiments as described herein for fastening and subsequently tensioning a tensionable cloth.

In a further aspect, the invention relates to a use of a cloth for fastening to and subsequently tensioning by a tensioning system according to one or several embodiments as described herein.

In a further aspect, the invention relates to a use of a cloth-tensioning system according to one or several embodiments as described herein for tensioning a tensionable and fastened cloth.

EXAMPLES

Reference is made to the figures by way of example. The embodiments illustrated in the figures relate to preferred embodiments of the present invention and should by no means be interpreted as being limiting.

Example 1: Tensioning System and Cloth-Tensioning System

FIG. 1A shows an illustration of a rectangular frame of a tensioning system (100) for a tensionable cloth (50) along the front of the frame (that is to say the side to which a cloth can be fastened). The frame is formed by four frame profiles (110*a*-110*d*) which are coupled together. The frame comprises several lateral tensioning systems (200) arranged at a certain distance from each other in the longitudinal direction of the top frame profile (110*b*) and the bottom frame profile (110*d*). The frame furthermore comprises four corner-tensioning systems (300) which are arranged in each corner of the frame.

Figure 1B:
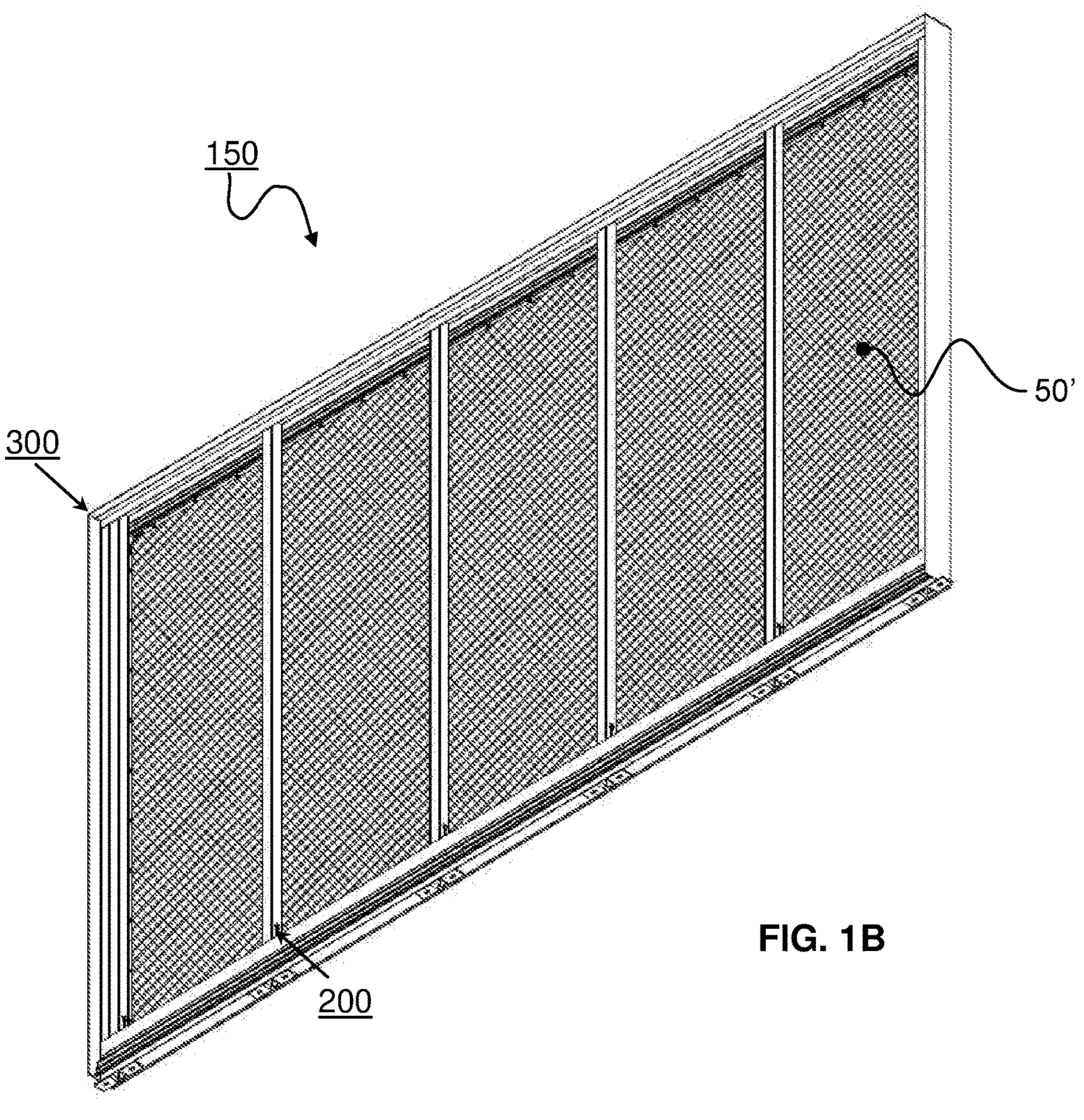
FIG. 1B shows a preferred embodiment of a cloth-tensioning system (150) with a tensioned cloth (50') along the rear of the frame.

Analogously to FIG. 1A, FIG. 1B shows an illustration of a cloth-tensioning system (150) along the rear of the frame. A tensionable cloth (50) was fastened along the front of the frame and tensioned by means of several lateral tensioning systems (200) and four corner-tensioning systems (300)

Example 2: Lateral Tensioning System

Figure 2A:
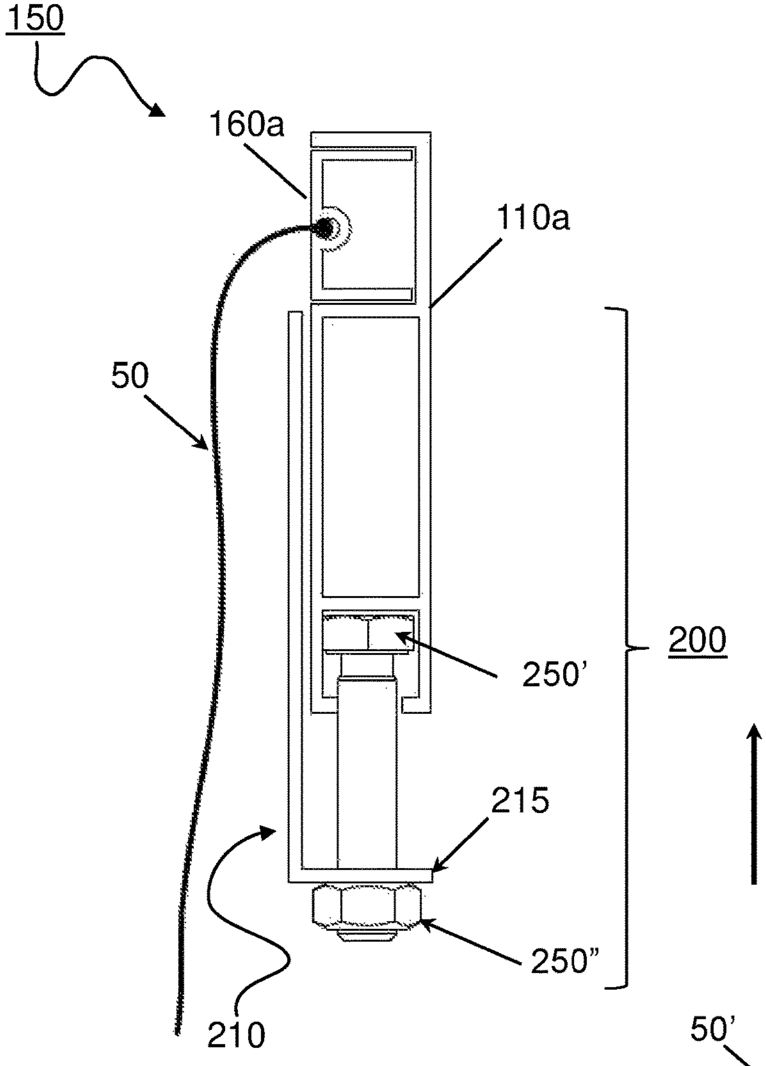
FIG. 2A illustrates a preferred embodiment of a lateral tensioning system (200) for a tensionable cloth (50).

FIG. 2 illustrates how a tensionable cloth (50) can be laterally tensioned by means of a preferred embodiment of a lateral tensioning system (200). In FIG. 2A, a non-tensioned cloth (50) is fastened to a cloth profile (160*a*) arranged in a frame profile (110*a*). On the inner side of the frame, which corresponds to the bottom of the frame profile (110*a*) in this figure, a tensioning profile (210) is coupled to the frame profile (110*a*); this coupling is brought about by means of a tensioning element (250) which comprises a bolt (250') and a nut (250"). In this case, the tensioning profile (210) is shown as an L profile.

The head of the bolt (250') is arranged in a space of the frame profile (110) and is clamped by the frame profile (110). The body of the bolt (250') projects from the frame profile (110*a*) in the medial direction (that is to say from the outside to the inside of the frame). The stop (215) of the tensioning profile (210) is fastened over the body of the bolt (250'); the bolt (250') passes through the hole of the stop (215). The nut (250") is placed over the stop (215) on the body of the bolt (250'); as a result thereof, the tensioning profile (210) is coupled to the frame profile (110*a*).

The coupling between the bolt (250') and the nut (250") is regarded as an adjustable coupling; a rotation of the nut (250") over the body of the bolt (250') will adjust the coupling. Adjustment of this coupling will laterally displace the tensioning profile (210) to the frame profile (110*a*) or decoupling thereof will displace the tensioning profile (210) away from the frame profile (110*a*).

Figure 2B:
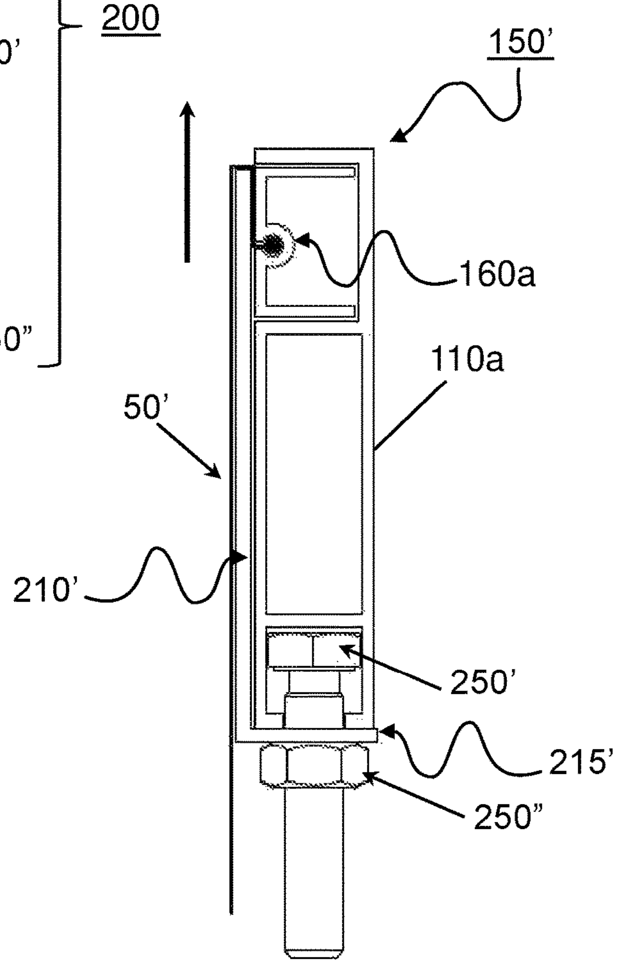
FIG. 2B illustrates a preferred embodiment of a lateral tensioning system (200) for a tensioned cloth (50').

FIG. 2B shows how the lateral displacement of the tensioning profile (210') of the lateral tensioning system (200) can tension a cloth. Adjustment of the coupling between the tensioning profile (210) and the tensioning element (250), illustrated here by rotation of the nut (250") over the body of the bolt (250'), will move the tensioning profile (210') closer to the frame profile (110*a*). This displacement will ensure that the body of the tensioning profile (210') will initially move over the frame profile (110*a*) and will move over the cloth profile (160*a*) from a certain displacement distance. The cloth (50') which is fastened to the cloth profile (160*a*) will in this case become clamped between the tensioning profile (210') and the cloth profile (160*a*). Depending on the degree of lateral displacement (indicated by an arrow), the tensioning profile will apply a tension to the cloth (50), as a result of which this becomes a tensioned cloth (50').

Example 3: Corner-Tensioning System

FIG. 3 illustrates how a tensionable cloth (50) can be diagonally tensioned by means of a corner-tensioning system (300). The corner-tensioning system is arranged in a corner of the frame formed by two adjoining frame profiles (110*b*, 110*c*).

Figure 3A:
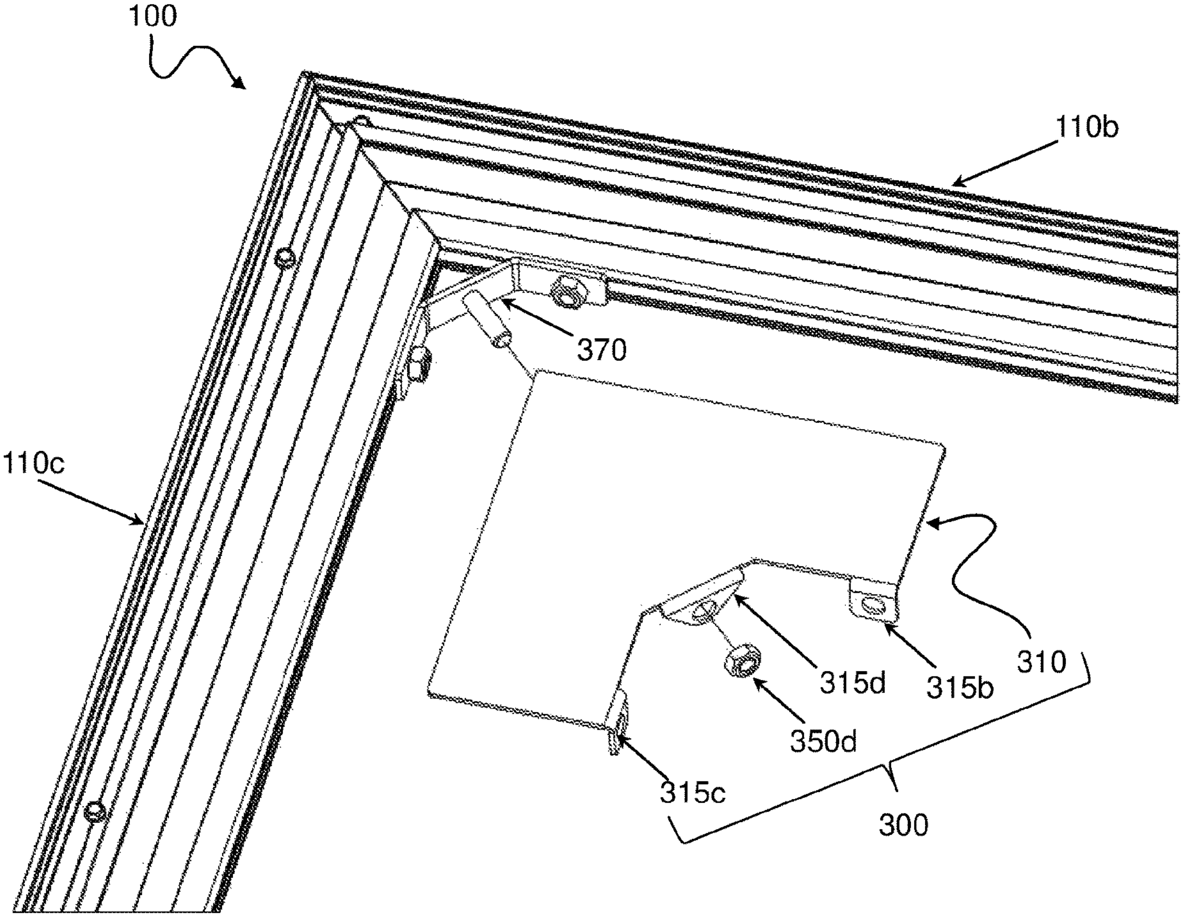
FIGS. 3A and 3B illustrate a preferred embodiment of a corner-tensioning system (300) for a tensionable cloth (50).

FIG. 3A illustrates the components of a preferred embodiment of a corner-tensioning system (300). This embodiment comprises a corner plate (310) comprising three stops (315*b*, 315*c*, 315*d*). Each stop is arranged in a different direction, namely a first stop (315*b*) directed towards the first frame profile (110*b*), a second stop (315*c*) directed towards the second frame profile (110*c*), virtually perpendicular with respect to the direction of the first stop (315*b*), and a third stop (315*d*) directed along the diagonal formed in the corner of the frame, virtually 45° with respect to the direction of the first stop (315*b*) and the direction of the second stop (315*b*).

The first stop (315*b*) can be coupled to the first frame profile (110*b*) by means of a first tensioning element knot shown). Adjusting the coupling between the first stop (315*b*) and the first tensioning element not shown) will displace the corner plate (310) in a lateral direction over the frame profile (110*b*) or over a cloth profile (not shown) of the frame profile (110*a*). Similarly, the second stop (315*c*) can be coupled to the first frame profile (110*c*) by means of a second tensioning element (not shown) and make a lateral displacement of the corner plate (310) possible.

By means of a third tensioning element (350*d*), the third stop (315*d*) can be coupled to an angle bracket (370) which is coupled to the two adjoining frame profiles (110*b*, 110*c*). The angle bracket (370) may be provided with a diagonally projecting coupling element suitable to be coupled to the third tensioning element (350*d*). Adjusting the coupling between the third stop (315*d*) and the angle bracket (370) will displace the corner plate (310) in a diagonal direction over the two adjoining frame profiles (110*b*, 110*c*) or over the cloth profiles (not shown) of the frame profiles.

Figure 3B:
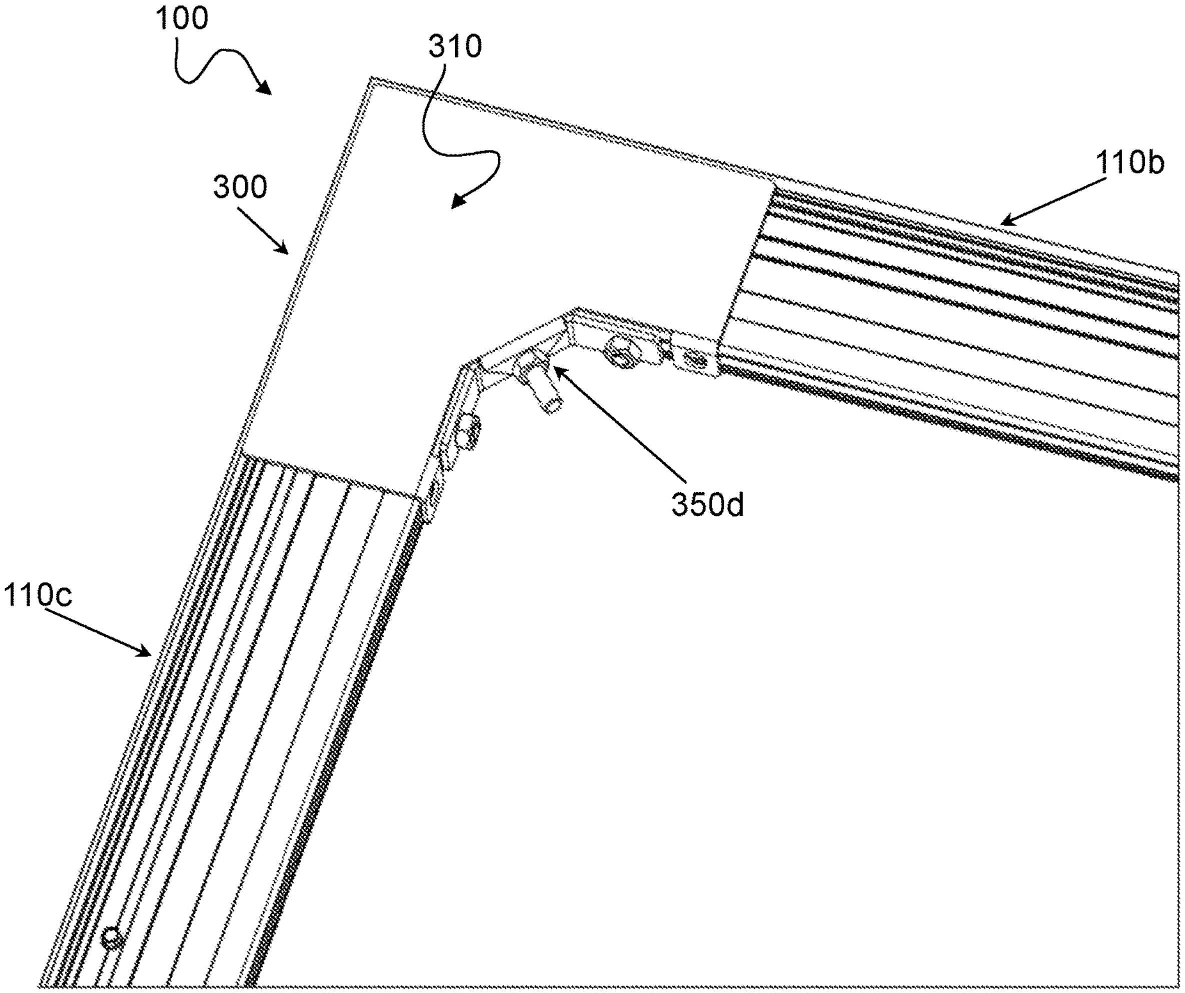

FIG. 3B subsequently illustrates the corner plate (310) in a tensioned position. A non-illustrated tensionable cloth (50) would be clamped in this position between the corner plate (310) and the two adjoining frame profiles (110*b*, 110*c*). Depending on the degree of diagonal displacement, the corner plate (310) will apply a tension to the cloth (50), as a result of which this becomes a tensioned cloth (50').

Example 4: Combination of a Corner-Tensioning System and Lateral Tensioning Systems FIGS. 4 and 5 show how a corner-tensioning system (300) and two lateral tensioning systems (200*b*, 200*c*) can be combined in order to tension a tensionable cloth (50).

Figure 4:
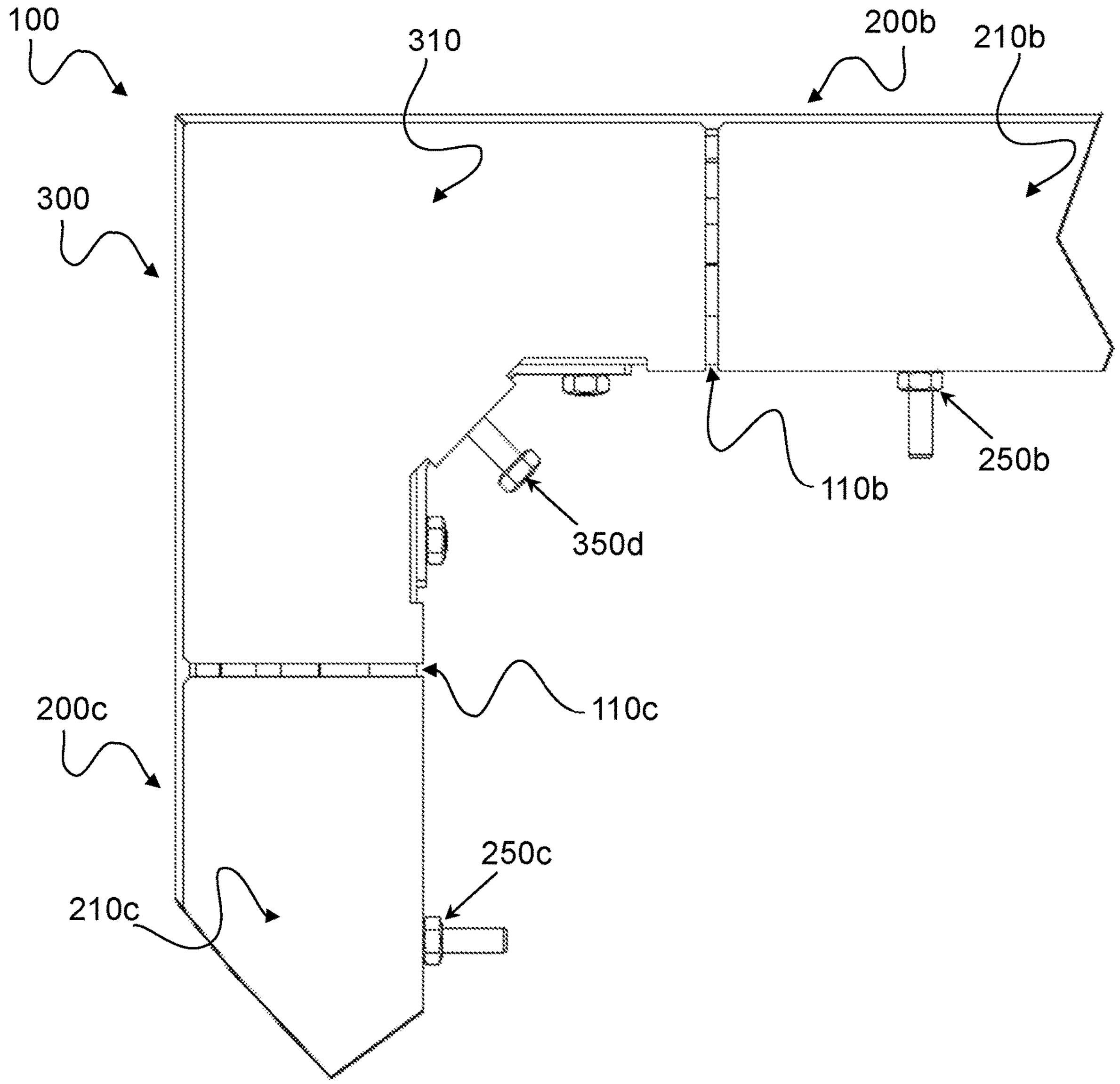
FIG. 4 illustrates a preferred embodiment of the tensioning system (100) comprising a corner-tensioning system (300) and two lateral tensioning systems (200*b*, 200*c*) for a tensionable cloth (50).

In FIG. 4, a corner-tensioning system (300) is arranged in a corner of the frame formed by two adjoining frame profiles (110*b*, 110*c*). On the inner side of each of the two frame profiles (110*b*, 110*c*), a lateral tensioning system (200*b*, 200*c*) is coupled. Optionally, an opening is provided between the corner-tensioning system (300) and each of the two lateral tensioning systems (200*b*, 200*c*).

Figure 5:
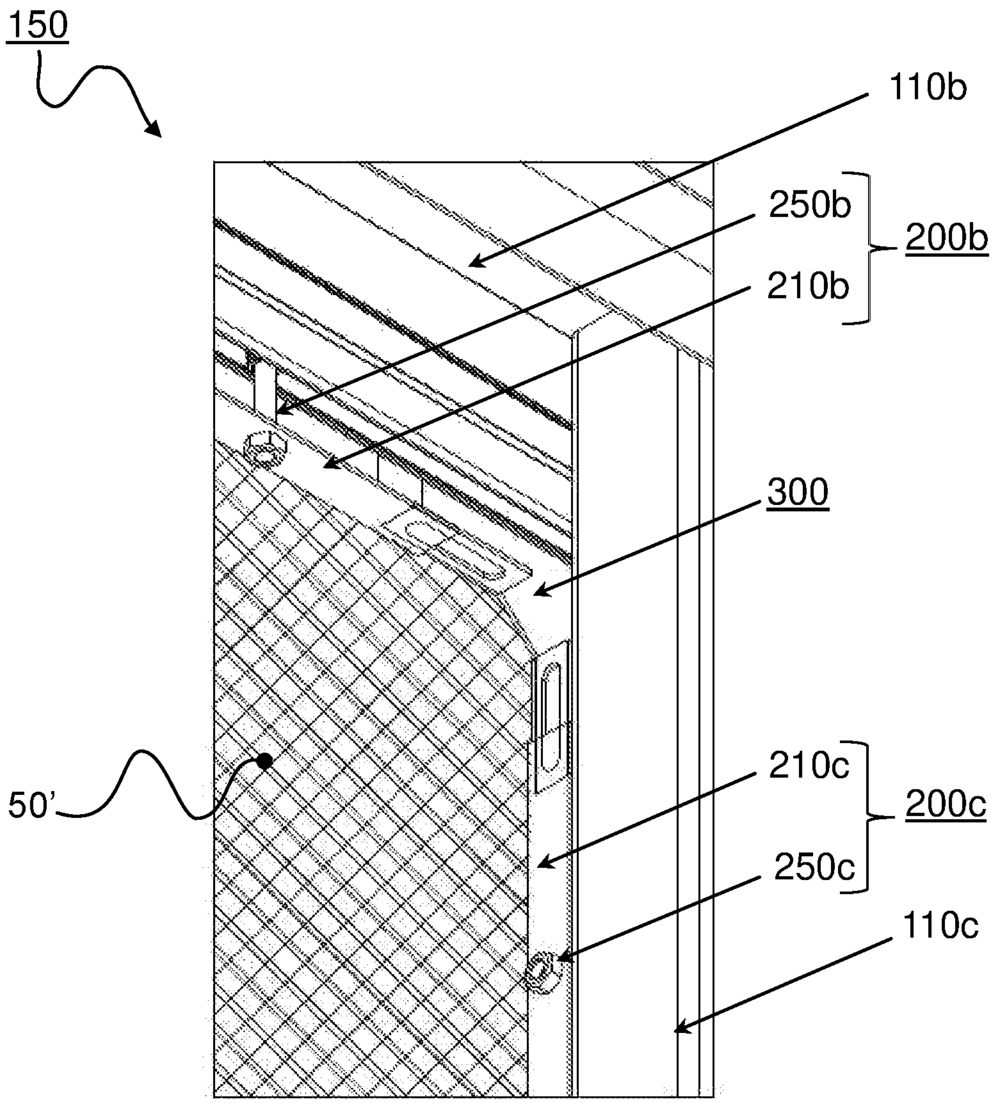
FIG. 5 illustrates a preferred embodiment of the cloth-tensioning system (150) comprising a corner-tensioning system (300) and two lateral tensioning systems (200*b*, 200*c*) with a tensioned cloth (50').

FIG. 5 shows how the arrangement from FIG. 4 makes it possible to tension a tensionable cloth (50) which is fastened to the frame of the cloth-tensioning system (150). In addition, all tensioning elements (250*b*, 250*c*) remain accessible via the rear of the frame, as a result of which replacement or removal of the tensioned cloth (50') remains possible.

The invention claimed is:

1. A tensioning system for tensioning a tensionable cloth, the tensioning system comprising:

a frame formed by at least one frame profile, wherein the at least one frame profile comprises a means for attaching the cloth;

a lateral tensioning system arranged on an inner side of the frame, the lateral tensioning system comprising at least one tensioning profile coupled to at least one frame profile, and comprising at least one stop which is adjustably coupled to a tensioning element, wherein the tensioning profile is configured to slide laterally over the frame, and wherein the lateral displacement is adjustable by adjusting the coupling between the tensioning profile and the tensioning element; and, a corner-tensioning system arranged in a corner of the frame, the corner-tensioning system comprising at least one corner plate coupled to at least one frame profile, and comprising at least one stop which is adjustably coupled to a tensioning element, wherein the corner plate is configured to slide diagonally over the corner of the frame, and wherein the diagonal displacement is adjustable by adjusting the coupling between the tensioning profile and the tensioning element.

2. The tensioning system as claimed in claim 1, wherein the tensioning element of the lateral tensioning system or the corner-tensioning system comprises a body and a control element which is couplable or coupled to the body; wherein the body is coupled to a frame profile, and the control element is coupled to the stop of the tensioning profile or the corner plate; wherein the control element is configured to be adjusted over the body such that the tensioning profile or the corner plate is displaced to slide laterally with respect to the coupled frame profile.

3. The tensioning system as claimed in claim 1, wherein the tensioning profile comprises an L profile.

4. The tensioning system as claimed in claim 1, wherein the tensioning profile of the lateral tensioning system comprises several stops which are adjustably coupled to several tensioning elements, wherein the stops are arranged at a certain distance apart in the longitudinal direction of the coupled frame profile.

5. The tensioning system as claimed in claim 1, wherein the corner plate comprises at least one diagonal stop for coupling to at least one tensioning element, wherein the coupling is configured to displace the corner plate in the diagonal direction.

6. The tensioning system as claimed in claim 1, wherein the corner-tensioning system comprises an angle bracket which is arranged in a corner of the frame, wherein one side of the angle bracket is coupled to two adjoining frame profiles and the other side is coupled to the corner plate.

7. The tensioning system as claimed in claim 6, wherein the angle bracket comprises a diagonally projecting coupling element, wherein the coupling element is couplable to or on a diagonal stop of the corner plate.

8. The tensioning system as claimed in claim 1, wherein the tensioning system comprises at least four corner-tensioning systems which are arranged in each corner of the frame.

9. The tensioning system as claimed in claim 1, wherein the means for attaching a cloth comprises a cloth profile to which or in which a cloth can be fastened.

10. A cloth-tensioning system, comprising the tensioning system as claimed in claim 1; and, a tensionable cloth fastened to the frame of the tensioning system;

wherein the cloth is arranged over a tensioning profile of one or several lateral tensioning systems, and over a corner plate of one or several corner-tensioning systems.

11. The cloth-tensioning system as claimed in claim 10, wherein the cloth comprises a base cloth and a fastening strip, which is fastenable or fastened to the frame of the tensioning system.

12. A method for tensioning a cloth, the method comprising:

(a) providing a tensionable cloth and a tensioning system as claimed in claim 1;

(b) laterally tensioning the cloth by adjusting the adjustable coupling between a stop of a tensioning profile and a tensioning element of the lateral tensioning system; and, (c) diagonally tensioning the cloth by adjusting the adjustable coupling between a stop of a corner plate and a tensioning element of the corner-tensioning system.

13. The method as claimed in claim 12, wherein the lateral and diagonal tensioning of steps (b) and (c) is carried out at least one of: simultaneously, step by step, and in turns.

14. The tensioning system as claimed in claim 1, further comprising the tensionable cloth tensioned by the tensioning system.

15. A method for tensioning a cloth, the method comprising:

(a) providing a cloth-tensioning system as claimed in claim 11;

(b) laterally tensioning the cloth by adjusting the adjustable coupling between a stop of a tensioning profile and a tensioning element of the lateral tensioning system; and, (c) diagonally tensioning the cloth by adjusting the adjustable coupling between a stop of a corner plate and a tensioning element of the corner-tensioning system.

16. The method as claimed in claim 15, wherein the lateral and diagonal tensioning of steps (b) and (c) is carried out at least one of: simultaneously, step by step, and in turns.

* * * * *